US012158273B2

(12) United States Patent
Mueller et al.

(10) Patent No.: US 12,158,273 B2
(45) Date of Patent: Dec. 3, 2024

(54) COOKTOP AND METHOD FOR OPERATING A COOKTOP AND USE OF A COOKTOP FOR ILLUMINATING A SPACE

(71) Applicant: E.G.O. Elektro-Geraetebau GmbH, Oberderdingen (DE)

(72) Inventors: Max-Felix Mueller, Oberderdingen (DE); Marcus Frank, Sulzfeld (DE); Frank Muenzner, Willingen (DE); Daniel Parker, Koenigsbach-Stein (DE); Peter Luettmann, Ubstadt-Weiher (DE)

(73) Assignee: E.G.O. ELEKTRO-GERAETEBAU GMBH, Oberderdingen (DE)

( * ) Notice: Subject to any disclaimer, the term of this patent is extended or adjusted under 35 U.S.C. 154(b) by 676 days.

(21) Appl. No.: 17/304,886

(22) Filed: Jun. 28, 2021

(65) Prior Publication Data

US 2022/0003421 A1 Jan. 6, 2022

(30) Foreign Application Priority Data

Jul. 1, 2020 (DE) ..................... 10 2020 208 221.9

(51) Int. Cl.
*F24C 7/08* (2006.01)
*F24C 15/10* (2006.01)
*H05B 1/02* (2006.01)

(52) U.S. Cl.
CPC ............ *F24C 7/083* (2013.01); *F24C 15/102* (2013.01); *H05B 1/0266* (2013.01)

(58) Field of Classification Search
CPC ........ F24C 15/10; F24C 15/102; F24C 7/083; H05B 1/0266

(Continued)

(56) References Cited

U.S. PATENT DOCUMENTS

| | | | | |
|---|---|---|---|---|
| 10,595,631 B2 | 3/2020 | Demol et al. | | |
| 2014/0001173 A1* | 1/2014 | Holzgreve | F24C 15/20 | 126/299 D |

(Continued)

FOREIGN PATENT DOCUMENTS

| | | |
|---|---|---|
| DE | 202014105596 U1 | 12/2014 |
| DE | 202016008271 U1 | 6/2017 |

OTHER PUBLICATIONS

German Patent and Trade Mark Office, Office Action received for Application No. 102020208221.9, dated Apr. 16, 2021, 11 pages, Germany.

*Primary Examiner* — Sang Y Paik
(74) *Attorney, Agent, or Firm* — Alston & Bird LLP

(57) ABSTRACT

A cooktop is designed to be operated either in a cooking operation or in a lighting operation, with the modes of operation not being able to occur together. Within cooking operation, the cooktop controller controls heating devices of the cooktop and light sources of the cooktop in a cooking lighting mode, wherein a luminosity of the light sources is limited to a cooking luminosity below the maximum luminosity in the process. Within lighting operation, the light sources are not controllable by the cooktop controller but can only be controlled by the light controller in an illumination lighting mode, wherein to this end the light controller receives the corresponding commands for the light sources from an external control apparatus by way of a communications device. In this case, a luminosity of the light sources can be maximal.

23 Claims, 2 Drawing Sheets

(58) Field of Classification Search
USPC .......................................... 219/443.1–468.2
See application file for complete search history.

(56) References Cited

U.S. PATENT DOCUMENTS

| | | | | |
|---|---|---|---|---|
| 2014/0305928 | A1* | 10/2014 | Thompson ............... | H05B 3/74 219/448.12 |
| 2020/0314970 | A1* | 10/2020 | Delgado Sancho . | H05B 6/1218 |
| 2020/0359470 | A1* | 11/2020 | de Morais .............. | H05B 3/746 |

* cited by examiner

COOKTOP AND METHOD FOR OPERATING A COOKTOP AND USE OF A COOKTOP FOR ILLUMINATING A SPACE

CROSS-REFERENCE TO RELATED APPLICATIONS

This application claims priority to German Application No. 10 2020 208 221.9, filed Jul. 1, 2020, the contents of which are hereby incorporated herein in its entirety by reference.

FIELD OF APPLICATION AND PRIOR ART

The invention relates to a cooktop with a cooktop panel and light sources underneath, which can be controlled with differently. Likewise, the invention relates to a method for operating a cooktop, in which light sources are either operated in a cooking operation or operated in a lighting operation. Their luminosity, in particular, can vary on the basis thereof. The invention also relates to the use of a cooktop for illuminating a space.

Providing cooktops with light sources below the cooktop panel is known from the prior art. These light sources either are provided in the region of an operating device, in particular for marking contact switches for a so-called touch operation, or are provided in the region of cooking points, i.e., heating devices, for example in order to mark these cooking points very well for the benefit of exact placement of a cooking vessel. With this, for example, it is possible also to dispense with printing or the like on the top side of the cooktop panel since the optical marking of the cooking point can be implemented exclusively from below the cooktop panel by means of the light sources.

Problem and Solution

The invention is based on the object of creating a cooktop as mentioned at the outset and a method as mentioned at the outset and the use as mentioned at the outset, by means of which problems in the prior art can be solved and it is possible in particular to expand the use of light sources in the cooktop or under the cooktop panel.

This object is achieved by a cooktop having the features of claim 1 and by a method for operating a cooktop having the features of claim 13 and by its use having the features of claim 25. Advantageous and preferred refinements of the invention are the subject matter of the further claims and will be discussed in more detail below. In so doing, some of the features are only explained for the cooktop, only explained for an operating method or only explained for its use. However, independently thereof, they should be able to apply both to the cooktop and to a method for operating a cooktop and to its use, on their own and independently of one another. The wording of the claims is incorporated into the content of the description by express reference.

The cooktop comprises a cooktop panel and a cooktop controller, which is predominantly designed for controlling heating devices arranged below the cooktop panel, and for supplying power to or setting the power of said heating devices. Moreover, light sources are arranged below the cooktop panel, i.e., in the cooktop. A light controller, which has a separate embodiment from the cooktop controller, is provided in the cooktop. The light controller is connected to at least one of the light sources, in particular to all light sources or all strongly radiating light sources of the cooktop. Moreover, the cooktop comprises a communications device, which is connected to the light controller and which is designed for communication with an external control apparatus. This communication is preferably implemented in wireless fashion, for example by WLAN, Bluetooth or BLE, infrared, LoRa or ZigBee, or using different radio standards. It is also possible for the light controller to be linked to the color controller of other electric appliances, for example a specified television. Optionally, a universal controller can be obtained by combining a plurality of interfaces or communications devices.

A changeover switch is provided in the cooktop and it connects the light controller either to the communications device or to the cooktop controller, or is able to switch over between the two. The changeover switch can advantageously be actuated by the cooktop controller, in particular triggered by an operating device of the cooktop. The changeover switch can be implemented both as a hardware switch, for example in the form of a galvanic switch with contacts or in the form of a semiconductor switch, and in a program or in software in the light controller for controlling the light sources. Then this program or this software controls the light controller back or forth between the communications device and the cooktop controller for connection purposes.

According to the invention, provision is made for the light sources to be designed to radiate out of the cooktop. In the process, they can radiate out or emit or shine through the cooktop panel or past the cooktop panel at the side. The light controller is designed, following the reception of a control signal, preferably following reception by way of the communications device from the external control apparatus, alternatively also by way of the cooktop controller itself, to control the light sources to radiate out of the cooktop. As a result of this radiation out of the cooktop it is possible, for example, to generate visible ambient lighting or background lighting in the space around the cooktop or in an entire kitchen. This can be provided purely for lighting, for example to be able to see better in the space or in the region around the cooktop and be able to identify objects. Alternatively and advantageously, it is possible to generate a certain mood, in particular by rays of colored light. A similar concept is known in the case of the so-called Ambilight televisions by Philips.

What can be achieved by separating the light controller and the cooktop controller and by the possible switchover is that the light sources do not operate in strong lighting operation within cooking operation when the cooktop controller controls light sources in the cooktop, for example for known optical signalling with a weak luminosity. Consequently, they cannot irritate or even blind an operator in this mode with light that is too strong, in order to avoid problems with the operation of the cooktop A lighting operation that is not strong or a weak lighting operation can be a so-called cooking lighting mode. A strong lighting operation can be a so-called illumination lighting mode. The latter can serve to illuminate the entire space or region around the cooktop.

Consequently, the invention firstly allows light sources in the cooktop to be used for conventional known signalling of operating states, error states or the like, i.e., as a type of information, in particular as an illuminated display, within cooking operation. Secondly, light sources in the cooktop may also shine relatively strongly within a lighting operation, for the purposes of generating the aforementioned ambient illumination or background illumination. This facilitates stimulating and novel light concepts in a space or region around the cooktop.

In one configuration of the invention, the cooktop can be designed to be placed with the cooktop panel on a worktop, i.e., not to be embedded with a flush surface. In this case, the top side of the cooktop panel can extend 1 mm to 10 mm above the top side of the worktop. Here, light guides or light exits of the light sources are arranged to the outside at at least one border of the cooktop panel, advantageously at a plurality of border sides or lateral sides of the cooktop panel, in particular to the side and back, optionally additionally also to the front. Here, the light guides or light exits can be arranged at a lateral outer edge of the cooktop panel or in the region of a lateral outer border of the cooktop panel on the underside thereof, and consequently as it were radiate out from between the cooktop panel and worktop. This can avoid the light sources having to radiate through the cooktop panel, in particular for the lighting operation, since such cooktop panels are often colored dark and have significant light absorption, or light radiating therethrough is significantly damped. Namely, this has the disadvantage that very strong light sources are required for radiating therethrough in order to actually create noticeable and pleasant or clear ambient lighting or background lighting.

Such aforementioned light guides or light exits can radiate in a direction which is at an angle ranging between 0° and 90° with respect to the face of the cooktop panel or the worktop. Therefore, they can radiate either substantially vertically upwards, at an angle or else horizontally onto the face of the worktop itself and, as the case may be, yield stimulating optical light effects or create ambient lighting or background lighting in all cases.

Alternatively, a cooktop can be installed with its cooktop panel being flush with the surface of the worktop, i.e., embedded with a flush surface. A material, preferably an adhesive or silicone, which fills the joint then needs to have a light-transmissive design, at least in regions, for light transmission purposes. Thus, light can radiate to the outside through the joint, with a light guide reaching to the light-transmissive material in the joint from the inside and radiating light therethrough. In that case, a light guide can even take up at least a region in the joint directly, and so it is not necessary to radiate through a further material as a sealant.

The light sources themselves should be arranged below the cooktop panel, i.e., be arranged advantageously at a distance of at least 1 cm or at least 3 cm from the points at which the light radiates out of the cooktop or through the cooktop panel. It is for this reason that precisely the aforementioned light guides are advantageously used, in particular in order to be able to arrange the light sources further away. By way of example, this can protect light sources against damage which could occur if they were arranged too close to the border and consequently too close to a source of possible damage.

In one advantageous configuration, provision is made for the cooktop controller and the light controller to each have their own microcontroller or each have their own control component. As a result, they can each carry out their control functions well despite their separate embodiment. The cooktop controller or its microcontroller can in this case execute all functions that are known from the prior art for cooktop controllers, in particular also carry out cooking programs. This requires a certain amount of computing power. Likewise, this microcontroller can also control certain display functions of the light sources as an illuminated display.

The light controller uses the microcontroller for controlling the light sources to vary color and/or luminosity within lighting operation. By way of example, this allows color profiles or color transitions to be generated for ambient lighting or room lighting particularly full of atmosphere or for distinct ambient lighting or room lighting.

Within the scope of the functional separation of cooktop controller and light controller, provision can be made for both to directly control the light sources and directly supply these with power in each case. This is possible particularly in the case of LEDs as light sources, which have a relatively low power uptake. Alternatively, the light sources can also have their own power control means, in particular power semiconductors, which need to be provided only once per light source. However, they can be controlled both by the cooktop controller and by the light controller but only with power limits which are specified for the respective controller, i.e., differently, in that case. In this case, a significant restriction in the luminosity is precisely specified for the cooktop controller. By way of example, it may be restricted to a value between 2% and 10% or up to 20% of the maximum luminosity of the light sources within cooking operation such that they shine only relatively weakly within cooking operation or in the cooking lighting mode. Within lighting operation or in the illumination lighting mode, they can shine significantly more strongly, preferably at between 70% and 90% of the maximum luminosity or at their maximum luminosity, in order to radiate out of the cooktop.

The light sources can be advantageously designed as the aforementioned LEDs or comprise such LEDs. In this case, use can be made in particular of LEDs with a power of more than 1 W, particularly preferably more than 4 W, per individual LED. Such strong LEDs can generate clearly visible and optically stimulating lighting effects in space, particularly if a plurality thereof, advantageously between 5 and 100, are arranged in the cooktop and operate in lighting operation.

In a further configuration of the invention, provision can advantageously be made for the cooktop to comprise at least one proximity sensor, which may be designed for example with IR technology, a photoelectric sensor, ultrasonic sensors or capacitive sensors, in particular as a known motion detector. The proximity sensor can be connected to the light controller; in particular, it can be connected only to the light controller and not to the cooktop controller. What this can achieve is that an operator approaching the cooktop or proximity sensor prompts the light controller to control the light sources in the cooktop in lighting operation or in the illumination lighting mode. This control is advantageously implemented with a luminosity below the maximum luminosity of the light sources since a user is, of course, close to the cooktop and consequently could be blinded inadvertently. However, the luminosity is significantly below the maximum luminosity, in particular by a factor of 2 to 100. Additionally, it is possible to incrementally set the luminosity within lighting operation. Hence, for example, the user or a person can be on the other side of the room and the luminosity or the lighting is not reduced as strongly as in the case of a presence in the direct vicinity of the cooktop.

In a development of the invention, provision can be made for the cooktop controller to not be activated or remain deactivated in the case where the light sources are activated by the proximity sensor. Consequently, the cooktop with its light sources and the proximity sensor only serves as a type of lighting, which is triggered by a proximity sensor. In this case, a cooking function is neither desired nor offered, more particularly even explicitly suppressed, which is why the cooktop controller remains deactivated. This only changes again once an operator has deliberately activated the cooktop.

Alternatively, a proximity sensor can be connected to the cooktop controller, said proximity sensor advantageously being arranged within the cooktop or at the cooktop. When a movement of a person or operator in the region of the cooktop is identified by the proximity sensor, the latter can prompt the cooktop controller to control the light sources in the cooktop within lighting operation. In this case, a luminosity should be below, advantageously significantly below, the maximum luminosity. Consequently, it is possible for a proximity sensor to trigger a lighting operation of the light sources by way of the light controller or by way of the cooktop controller. Cooking operation need not necessarily be started or offered to this end.

In yet a further configuration of the invention, it is possible for a specified proximity sensor to be designed as an external sensor for the external control apparatus or as an external sensor at the external control apparatus. This proximity sensor can control the light sources in the cooktop within lighting operation if the presence of an operator is identified either at the external control apparatus or at the cooktop. This is advantageously implemented by way of the light controller, by means of which the external control apparatus can communicate via the communications device and can transmit appropriate control commands. Here, too, provision can be made for a luminosity to remain below the maximum luminosity. The advantage of this is that the maximum luminosity of the cooktop should not be achieved in the case of such a presence of a person in the vicinity thereof so that the person is not blinded or irritated.

An external control apparatus can be a type of distinct remote control for the cooktop or its lighting operation. Alternatively, this can be a smartphone, a tablet computer, a virtual assistant or automation applications such as IFTTT or the like. What is advantageously ensured is that a connection between the communications device and the light controller is physically or logically separated from a channel or connection for the cooking operation or the operation of the heating devices of the cooktop, i.e., the relevant connection to the cooktop controller.

For a method for operating the cooktop, provision is made for the latter to be operated either in cooking operation or in lighting operation. These types of operation cannot occur together, with care precisely having to be taken that there is certain lighting within cooking operation of the cooktop, as explained at the outset. This can indeed also be implemented by these light sources, which can shine very brightly within lighting operation. However, as explained above, they should only shine weakly within cooking operation and in particular not disturb an operator while cooking. In this case, by definition, the cooktop controller within cooking operation controls heating devices of the cooktop for the actual task of the cooktop and controls light sources of the cooktop in the cooking lighting mode, i.e., relatively weakly. In this cooking lighting mode, a luminosity of the light sources can be restricted to a cooking luminosity below the maximum luminosity of the light sources, for example to the aforementioned at most 2% or at most 5% or at most 20%.

Secondly, the cooktop can operate in a lighting operation, wherein the light sources are not controllable by the cooktop controller in this case but only controllable by the light controller, to be precise in an aforementioned illumination lighting mode. The latter differs from the cooking lighting mode by the luminosity, which is thus significantly stronger in the case of pure lighting. In this case, the light sources can be operated or shine at full luminosity and radiate out of the cooktop. Advantageously, provision can be made for the light controller to receive the corresponding commands for the light sources within lighting operation from the external control apparatus by way of the communications device. Thus, the cooktop controller is circumvented in this case, as a result of which it is also possible to achieve the cooktop not being able to be operated for cooking. However, what can be predominantly achieved by the strict separation is that within cooking operation the light sources cannot be controlled by the light controller but only by the cooktop controller. Thus, the aforementioned restriction of its luminosity can be ensured, which is, as it were, fixedly entered into the cooktop controller.

In one advantageous configuration of the invention, provision can be made for a switchover between cooking operation and lighting operation to be possible on the cooktop itself. To this end, the cooktop can have corresponding operating elements on an operating device, in particular a changeover operating element. In one advantageous configuration of the invention, provision can be made for a switchover to also be possible on the external control apparatus. Particularly advantageously, a switchover can be carried out with precedence at the cooktop itself, before a switchover at the external control apparatus, in particular from lighting operation to cooking operation. This may also apply to the other direction since a switchover at the cooktop itself ensures that an operator carrying out this switchover has a better grasp of the situation at the cooktop than an operator at the external control apparatus, which may be slightly further or significantly further away from the cooktop. It may likewise be possible to program the lighting, i.e., the luminosity, lighting patterns or the color of the lighting, by way of the operating device of the cooktop or corresponding operating elements.

Here, provision can be made for the switchover to be initiated by an operating element or the external control apparatus, the switchover process itself occurring physically or logically on a separate component or in a manner integrated into the cooktop controller or light controller.

In a further configuration of the invention, provision can be made for a switchover on the external control apparatus from cooking operation to lighting operation to be blocked and be impossible for as long as the cooking operation lasts or continues or for as long as a heating device is activated and/or is programmed for activation. Consequently, there can only be a switchover into the lighting operation at the external control apparatus if no cooking function of the cooktop is active.

In a development of the invention, it is possible within operation of the cooktop in lighting operation for an operation of an operating element of an operating device of the cooktop to stop, more particularly immediately stop, the lighting operation. This may apply to a specific operating element or else to an arbitrary operating element, i.e., any operating element of the operating device. During this stopping, it is possible in particular to separate the connection between light controller and communications device such that the light controller can no longer be controlled externally and consequently lighting is also only still possible within cooking operation or in the cooking lighting mode by way of the cooktop controller.

Preferably, provision can be made for the cooktop controller or control commands of the cooktop controller to have precedence over the external control apparatus or its control commands. What applies in this case too is that a person directly operating the cooktop controller can better assess the situation at the cooktop than a person with the external control apparatus who may be a distance away.

In yet a further configuration of the invention, provision can be made for an activation of the light sources by the proximity sensor to not activate the cooktop controller.

Consequently, the cooktop controller remains deactivated in this case since a desired cooking function of the cooktop cannot be identified either.

In a development of the invention, a bus activity of a bus of the cooktop controller or between the cooktop controller and the changeover switch or the light controller can be monitored. If a bus activity is determined on this bus, preferably between the changeover switch and the cooktop controller, the changeover switch is actuated. In particular, the cooktop controller is connected to the light controller and the communications device is separated from the light controller. Consequently, the external control apparatus can no longer control the light sources within a strong or bright lighting operation or cooking lighting mode. An operator is therefore no longer blinded.

In yet a further configuration of the invention, provision can be made for the lighting operation to be started automatically and independently again following a deactivation of the cooktop and a renewed activation. This may be implemented with the previously used setting for the lighting operation or the light sources. This setting may have been buffer-stored in a memory of the light controller. Alternatively, a user input on the cooktop and on the external control apparatus may be awaited such that the lighting operation does not yet start immediately. The lighting operation can start following such a user input, advantageously in an aforementioned illumination lighting mode.

These and further features will emerge not only from the claims but also from the description and the drawings, wherein the individual features may each be realized individually or severally in the form of sub-combinations in an embodiment of the invention and in other fields and constitute advantageous and independently protectable embodiments, for which protection is claimed here. The division of the application into individual sections and intermediate subheadings does not mean that the statements made under these are restricted in terms of their general applicability.

BRIEF DESCRIPTION OF THE DRAWINGS

Exemplary embodiments of the invention are schematically illustrated in the drawings and will be discussed in more detail below. In the drawings.

DETAILED DESCRIPTION OF THE EXEMPLARY EMBODIMENTS

Figure 1:
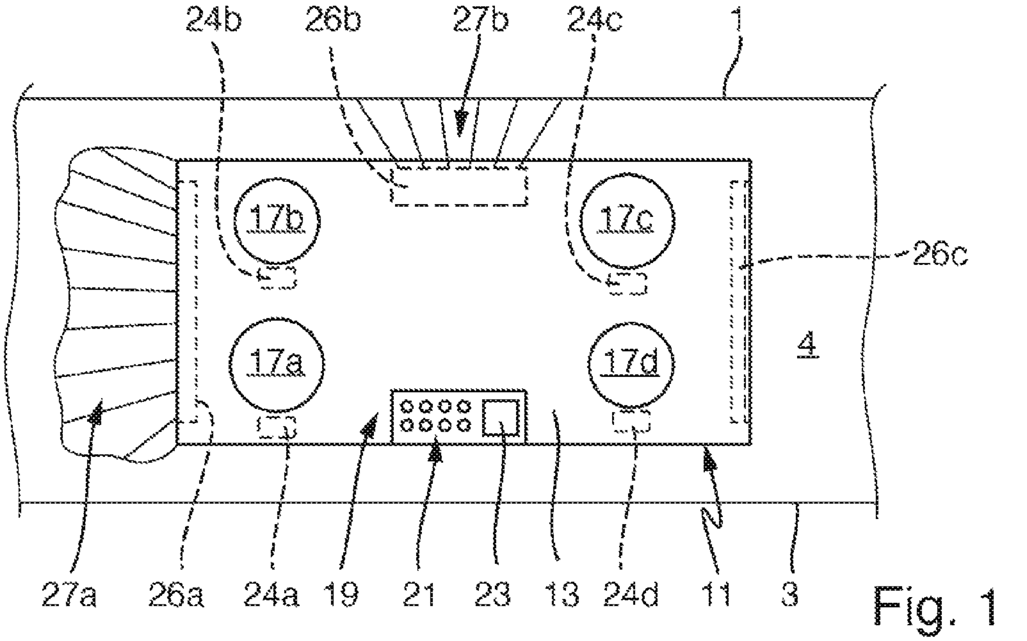
FIG. 1 shows a plan view of an arrangement of a cooktop according to the invention in a worktop.

FIG. 1 illustrates a plan view of a cooktop 11 according to the invention. The cooktop 11 is installed in a worktop 3, which is attached to a wall 1 or abuts the latter. The cooktop 11 has a cooktop panel 13 with a top side 14 and a bottom side 15. The cooktop panel 13 advantageously consists of hard glass or a glass ceramic and although it is light transmissive, it is significantly stained red brown in the case of a glass ceramic. Consequently, it is well known that the light transmissivity is not very high.

The cooktop 11 has four cooking points 17*a* to 17*d*, each cooking point 17 being formed by at least one associated heating device. The type of heating device is as desired; these can be induction heating coils or radiation heating devices.

In the central front region, the cooktop 11 has an operating device 19 which comprises operating elements 21 and an illuminated display 23 as a type of the user interface. The operating elements 21 are advantageously designed as touch switches and the illuminated display 23 can have one or more seven-segment displays. Alternatively, the illuminated display 23 can also be a matrix display, i.e., display any desired illustrations. The operating elements 21 can be rendered identifiable by LEDs, i.e., weak light sources. Their functional or switching state can likewise be rendered identifiable.

A respective high-temperature warning display 24*a* to 24*d*, indicated here by dashed lines, is provided in front of each cooking point 17*a* to 17*d*. Such a high-temperature warning display 24 indicates that the cooktop panel 13 still is too hot in the region of the cooking point 17 for it to be touched by hand. Thus, the high-temperature warning display 24 is only illuminated if the temperature at the cooking point 17 is too high. As an alternative to an illustrated arrangement of the high-temperature warning displays 24 in front of the cooking points 17, there can also be an arrangement in the region of the operating device 19 itself, with their arrangement among themselves being able to correspond to the arrangement of the cooking points 17 among themselves. The high-temperature warning displays 24 are formed by LEDs or weak light sources, as specified above. However, they are strong enough to radiate through the cooktop panel 13.

Furthermore, three light sources 26*a*, 26*b* and 26*c* are illustrated in FIG. 1 using dashed lines. The light source 26*a* is provided on the left lateral side of the cooktop 11. As illustrated in exemplary fashion to the right in FIG. 2, it radiates horizontally or at a flat angle, possibly even slightly downward, onto the top side 4 of the worktop 3 with a light apparition 27*a*. This light apparition 27*a* then is easily visible for an operator; it can also bring about a certain illumination of the space or of the region around the cooktop 11 or, especially, thereover. Moreover, the light apparition 27*a* can have different colors depending on the color of the associated light source 26*a*. This color can also be alternated or be mixed by appropriately designed or different light sources or LEDs.

A light source 26*b* is provided below the cooktop panel 13 in the back central region of the cooktop 11. It radiates light substantially vertically upward; possibly it also illuminates part of the wall 1 in the process. Consequently, the light apparition 27*b* becomes visible to an operator above the cooktop 11 and on the wall 1.

A light source 26*c* is provided on the right lateral side of the cooktop 11. It radiates directly vertically upward, and so no corresponding light apparition is directly visible on the top side 4 of the worktop 3 or on the wall 1. Rather, the light source 26*c* can illuminate the ceiling and consequently generate indirect room lighting.

Figure 2:
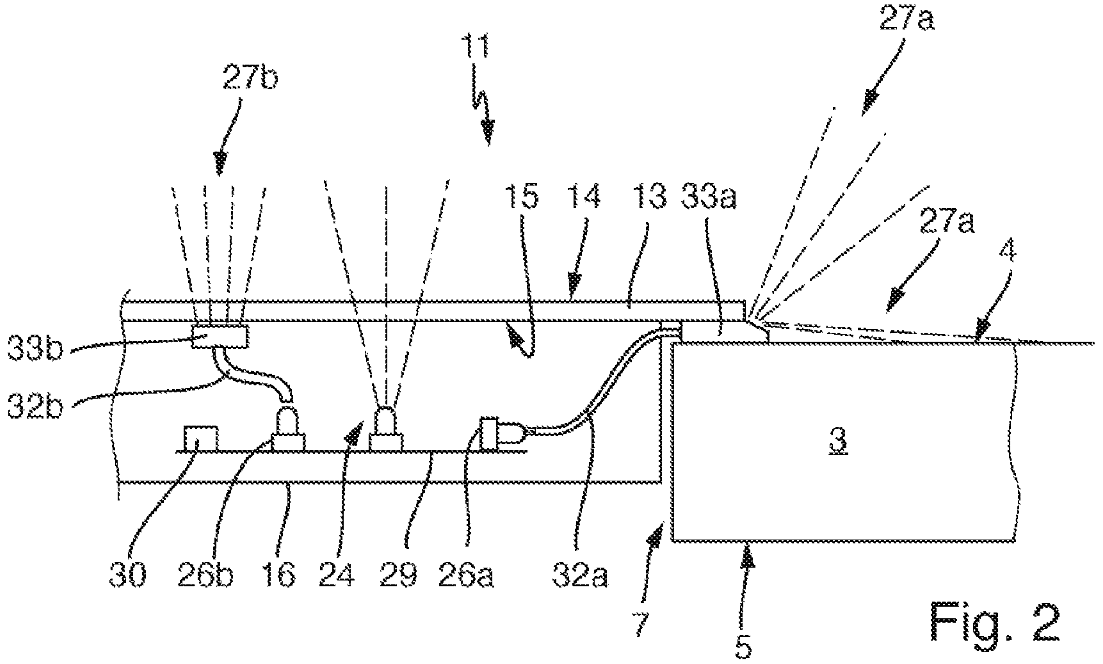
FIG. 2 shows a sectional illustration through the arrangement of FIG. 1

It is evident from the sectional illustration of FIG. 2 that the worktop 3 has a cutout 7 in a known manner. The cooktop 11 is embedded in this cutout 7 by way of a housing 16 fastened to the bottom side 15 of the cooktop panel 13. However, the cooktop panel 13 itself is not embedded or does not have a flush surface with the top side 4 of the worktop 3; instead, it extends above the latter.

A distance of less than 1 cm, advantageously a few mm, is provided between the bottom side 15 of the cooktop panel 13 and the top side 4 of the worktop 3. A light exit 33*a*, which is connected to a light source 26*a* by means of a light guide 32*a*, is arranged here. The end of the light exit 33*a* protruding beyond the border of the cooktop panel 13 to the right is at least partly bevelled. As a result, firstly light can radiate slightly downward to the top side 4 and bring about a light apparition 27*a* there, as has also been explained in relation to FIG. 1. Secondly, light can be emitted upward at an angle of approximately 70° by the light exit 33*a*; this likewise yields a light apparition 27*a*, which is directed into the room. The light exit 33*a* can consist of plastic, for example Plexiglas, polycarbonate or a similar material. Alternatively, it can consist of mineral glass, as a result of which it is very robust and has good optical properties.

Alternatively, a cooktop whose cooktop panel is flush with the surface of the worktop, i.e., which is embedded with a flush surface, is also conceivable. To this end, an adhesive or silicone inserted into the joint needs to be light transmissive. Thus, the light can radiate to the outside through the joint, with a light guide then reaching to the light-transmissive material in the joint from the inside and radiating light therethrough. This is easily conceivable on the basis of FIG. 2.

The light source 26*a* is advantageously formed by a powerful LED, particularly advantageously with a power of more than 4 W or even more than 10 W per LED. By way of one or more light guides 32*a*, a plurality of such LEDs can together radiate into the light exit 33*a* as a light source 26*a*. This also applies to the other light sources 26*b* or light exits 33*b*. These are illustrated to the left, with the light exit 33*b* being arranged on the bottom side 15 of the cooktop panel 13. It radiates substantially vertically upward through the worktop 13 and brings about a light apparition 27*b*. A part of this light distribution 27*b* also radiates at a slight angle, which may lead to the illumination on the wall 1 as described in relation to FIG. 1.

The light sources 26*a* and 26*b* are arranged on a common printed circuit board 29. By way of example, a high-temperature warning display 24, as has been explained above, is also arranged there. It also radiates upward through the cooktop panel 13; however, the high-temperature warning display 24 may not shine as strongly as the light sources 26 by a long way. In this case, the factor can be ten to at least 100. As it were, the light of the high-temperature warning display 24 should only be identifiable directly on the cooktop panel 13, as is known from the prior art.

A power supply 30 for the light sources 26 is also still illustrated on the printed circuit board 29 in schematic form. This can be realized by means of power semiconductors or correspondingly suitable LED drivers.

Figure 3:
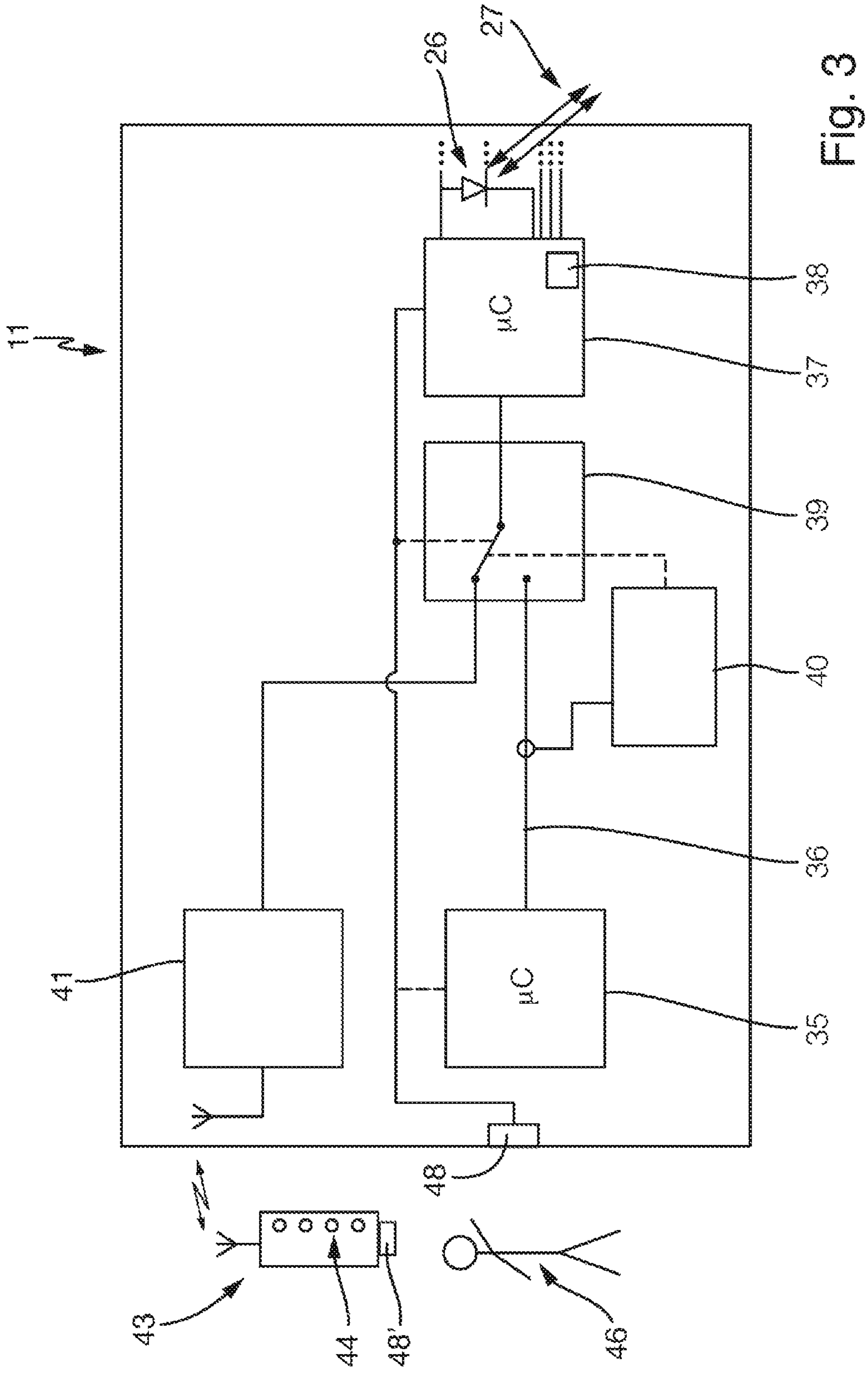
FIG. 3 shows a functional illustration of the control of the light sources in the cooktop with cooktop controller, changeover switch and light controller.

In FIG. 3, a cooktop 11 is illustrated in much simplified schematic fashion in respect of the control of light sources 26, one of which is illustrated far right together with its light apparition 27. The light source 26 is controlled by a light controller 37, possibly also via aforementioned power semiconductors or LED drivers (not illustrated) if corresponding electric powers should be set. Finally, the light sources 26 should be able to shine with different brightness levels or be able to be set in terms of their luminosity. In particular, this should apply to a setting between a very high luminosity for lighting operation or the illumination lighting mode. Lower luminosity levels are provided for the cooking lighting mode or a cooking luminosity. In this case, the factor can be between five or 10 to 20 or even 50. Thus, in a cooking lighting mode, the light sources 26 which should be able to generate the light apparitions 27 for ambient illumination in an illumination lighting mode can form, e.g., high-temperature warning displays 24 or can display any other information, which is identifiable and processable by an operator present, on the cooktop 11. If LEDs with a lower luminosity, i.e., different light sources, are used for the cooking lighting mode, then the luminosity levels in the two aforementioned operating cases can also be the same.

The light controller 37 has a memory 38, in which it is possible to store an ambient lighting or background lighting last set, which was prevalent within lighting operation as illumination lighting mode before an operator 46 used the cooktop 11 for cooking or in cooking operation. The light sources 26 were possibly used in the cooking lighting mode within this cooking operation. Once the operator 46 has finished with the cooking operation, the previously prevalent ambient lighting or the previously implemented lighting operation can be recalled from the memory 38 and consequently be re-established, possibly automatically. Alternatively, it is also possible to await a user input on the external control apparatus 43 for renewed lighting operation.

Such lighting operation can be set by the operator 46 by means of an external control apparatus 43. To this end, the external control apparatus 43 can have control elements 44. Thus, the operator 46 can be a few meters away from the cooktop 11 and set a lighting operation by means of the external control apparatus 43. To this end, the external control apparatus 43 establishes a connection with the communications device 41 by a wireless connection mentioned at the outset. The communications device is connected or connectable to the light controller 37 by way of a changeover switch 39. Thus, the cooktop 11 was switched off or the cooktop controller 35 was deactivated. Nevertheless, the external control apparatus 43 allows the operator 46 to set a lighting operation with an illumination lighting mode for the light sources 26 at the light controller 37. Possibly, a proximity sensor 48' attached to the external control apparatus 43 can monitor the presence of the operator 46 in the vicinity of the external control apparatus 43.

The changeover switch 39 described can connect the light controller 37 either to the communications device 41 or to the cooktop controller 35. From the communications device 41, the light controller 37 receives commands for the lighting operation or the illumination lighting mode of the light sources 26, i.e., with high or maximum luminosity. Since this luminosity would be bothersome or too high if an operator 46 or another person approaches the cooktop 11, generally advantageously approaches to a distance of less than 2 m or less than 1 m, a proximity sensor 48 may generally be provided at a suitable point, particularly advantageously on the cooktop 11 itself. By way of example, this may be in a front region. If the proximity sensor 48 registers an approach of a person or the operator 46 to less than the aforementioned distance, it can by way of its connection to the light controller 37 bring about a reduction in the luminosity of the light sources 26, even deactivate the latter under certain circumstances.

Moreover, a switchover can be caused directly by way of an alternative or additional connection, illustrated using dashed lines, between the proximity sensor 48 and the changeover switch 39 such that the light controller 37 no longer obtains commands from the communications device 41. As a result, the lighting operation is automatically stopped or suspended and possibly restarted later, for the purposes of which the last prevalent setting can be stored in the memory 38. Consequently, the changeover switch 39 can also be actuated by the proximity sensor 48.

A further option is illustrated using dashed lines, specifically by virtue of the proximity sensor 48 being connected directly to the cooktop controller 35. If the operator 46 approaches in the aforementioned manner, the proximity sensor 48 can activate or, as it were, wake up the cooktop controller 35. This can bring about an activity, mentioned at the outset, on a bus 36 of the cooktop 35, which leads to the changeover switch 39. This can be registered by an activity monitor 40, which is connected to this bus 36. By way of a connection illustrated using dashed lines, the activity monitor 40 can switch over the changeover switch 39 and terminate the lighting operation.

In a yet further possibility, a proximity sensor 48 is dispensed with and an operation of the operator 46 on the operating device 19, which is connected to the cooktop controller 35, brings about such a bus activity in the bus 36. This is also identified, in turn, by the activity monitor 40, which can bring about a switchover at the changeover switch 39.

Moreover, provision is advantageously made for the cooktop controller 35 or the commands thereof for cooking operation to have precedence over commands from the external control apparatus 43 for the lighting operation. This also applies to operation by the operator 46 on the operating device 19, which is ultimately connected to the cooktop controller 35. This can reduce the susceptibility of errors in the communication between the external control apparatus 43 and the communications device 41, or lessen the effects thereof.

It is also particularly advantageous if the activation of the light sources 26 in the cooktop 11 by means of the light controller 37 does not bring about or require an activation or switch-on of the cooktop controller 35. For this reason, the light controller 37, precisely by means of the changeover switch 39, is directly connectable to the communications device 41 or can even always be connected thereto whenever the cooktop controller 35 is deactivated. Only an activated cooktop controller 35, which is indicated by activities on the bus 36, or a capture of a person approaching the proximity sensor 48 can then change over the changeover switch 39 and connect the cooktop controller 35 to the light controller 37. As a result, the light sources 26 can only still operate in the weaker cooking lighting mode.

The invention with the functionality as per FIG. 3 can be realized by way of an additional module on a cooktop controller 35, known per se, on a printed circuit board. The additional module then comprises a communications device 41, the changeover switch 39 and the light controller 37. Alternatively, new equipping with assemblies can be realized on a common printed circuit board with the cooktop controller 35.

The invention claimed is:

1. A method for operating a cooktop, the method comprising:
- providing a cooktop comprising:
  - a cooktop panel with heating devices,
  - a cooktop controller,
  - a plurality of light sources under said cooktop panel, wherein said plurality of light sources are each positioned to radiate out of said cooktop through said cooktop panel or past said cooktop panel at a side,
  - a light controller in said cooktop, which light controller is designed separately from said cooktop controller and is connected to at least one of said light sources,
  - a changeover switch which connects said light controller either to said communications device or to said cooktop controller, and
  - a communications device being connectable to said light controller by means of said changeover switch and being designed for communication with an external control apparatus,
- operating said cooktop either in a cooking operation mode or in a lighting operation mode, with said cooking operation mode and said lighting operation mode do not occur together, and
- within said cooking operation mode of said cooktop, controlling, via said cooktop controller controls, said heating devices of said cooktop and said light sources of said cooktop in a cooking lighting mode,
- within said lighting operation mode of said cooktop;
  - disabling control of said light sources by said cooktop controller, and
  - enabling control of said light sources only by said light controller and in an illumination lighting mode that is configured to generate an ambient lighting or a background lighting in a space around said cooktop.

2. The method as claimed in claim 1, wherein said light sources have or include light guides or include light exits.

3. The method as claimed in claim 2, wherein said cooktop is designed to be placed with said cooktop panel on a worktop, and wherein said light guides or said light exits of said light sources are arranged outside at least one border of said cooktop panel.

4. The method as claimed in claim 3, wherein said light guides or said light exits are arranged at a lateral outer edge of said cooktop panel or in said region of a lateral outer border of said cooktop panel on a bottom side of said cooktop panel.

5. The method as claimed in claim 3, wherein said light sources are arranged below said cooktop panel and radiate said light from said cooktop by means of said light guides.

6. The method as claimed in claim 1, wherein said light sources are designed to radiate substantially upward in a vertical direction.

7. The method as claimed in claim 1, wherein said light sources are designed to radiate out of said cooktop substantially in a horizontal direction.

8. The method as claimed in claim 1, wherein said cooktop controller and said light controller each have a microcontroller of their own or each have a controller component of their own.

9. The method as claimed in claim 1, wherein said light sources have LEDs.

10. The method as claimed in claim 1, wherein the cooktop has a proximity sensor, wherein said proximity sensor is connected to said light controller.

11. The method as claimed in claim 10, wherein said proximity sensor is connected only to said light controller and is not connected to said cooktop controller.

12. The method as claimed in claim 1, wherein said light controller receives a control signal and corresponding commands for said light sources from an external control apparatus by way of said communications device.

13. The method as claimed in claim 12, wherein said reception of said control signal takes place by way of said communications device from said external control apparatus or alternatively by way of said cooktop controller.

14. The method as claimed in claim 12, wherein a proximity sensor is arranged as an external sensor for said external control apparatus or as an external sensor on said external control apparatus, wherein said proximity sensor, when a movement of a person is identified in a region of said cooktop, prompts said external control apparatus to control said light sources in said cooktop within said lighting operation.

15. The method as claimed in claim 1, wherein a switchover between said cooking operation and said lighting operation is implemented on said cooktop by means of operating elements of an operating device of said cooktop.

16. The method as claimed in claim 15, wherein said switchover is also possible on an external control apparatus, wherein said switchover is carried out with precedence at said cooktop before said switchover on said external control apparatus.

17. The method as claimed in claim 15, wherein said switchover is initiated by an operating element or by an external control apparatus, said switchover occurring physically or logically on a separate component or in a manner integrated into said cooktop controller or said light controller.

18. The method as claimed in claim 15, wherein said switchover on an external control apparatus from said cooking operation to said lighting operation is blocked for as long as said cooking operation lasts or for as long as one of said heating devices is activated or is programmed for its activation.

19. The method as claimed in claim 1, wherein while said cooktop is operated in said lighting operation, an operation of an operating element of an operating device of said cooktop on said cooktop itself stops said lighting operation by breaking a connection between said light controller and said communications device, such that only lighting within said cooking operation by way of said cooktop controller still is possible.

20. The method as claimed in claim 1, wherein a proximity sensor is connected to said cooktop controller, wherein said proximity sensor, when a movement of a person is identified in a region of said cooktop, prompts said cooktop controller to control said light sources in said cooktop within said lighting operation.

21. The method as claimed in claim 20, wherein said cooktop controller is not activated or said cooktop controller remains deactivated in a case where the said sources are activated by said proximity sensor.

22. The method as claimed in claim 1, wherein a proximity sensor is connected to said light controller, wherein said proximity sensor, when a movement of a person is identified in a region of the cooktop, prompts said light controller to control said light sources in said cooktop within said lighting operation.

23. The method as claimed in claim 1, wherein a bus is provided between said cooktop controller and said changeover switch, a bus activity of said bus being monitored, wherein said cooktop controller is connected to said light controller and said communications device is separated from said light controller, wherein said changeover switch is actuated when said bus activity is detected between said changeover switch and said cooktop controller.

* * * * *